US011804249B2

(12) United States Patent
Bloch et al.

(10) Patent No.: US 11,804,249 B2
(45) Date of Patent: *Oct. 31, 2023

(54) SYSTEMS AND METHODS FOR ADAPTIVE AND RESPONSIVE VIDEO

(71) Applicant: JBF Interlude 2009 LTD, Tel Aviv (IL)

(72) Inventors: Jonathan Bloch, Brooklyn, NY (US); Tal Zubalsky, Brooklyn, NY (US); Yuval Hofshy, Kfar Saba (IL); Barak Feldman, Tenafly, NJ (US)

(73) Assignee: JBF Interlude 2009 LTD, Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/559,082

(22) Filed: Sep. 3, 2019

(65) Prior Publication Data

US 2019/0392868 A1   Dec. 26, 2019

Related U.S. Application Data

(63) Continuation of application No. 14/835,857, filed on Aug. 26, 2015, now Pat. No. 10,460,765.

(51) Int. Cl.
*G11B 27/34* (2006.01)
*G11B 27/36* (2006.01)
(Continued)

(52) U.S. Cl.
CPC ............. *G11B 27/34* (2013.01); *G11B 27/10* (2013.01); *G11B 27/102* (2013.01); *G11B 27/36* (2013.01);
(Continued)

(58) Field of Classification Search
CPC ............ G06F 2200/1614; G11B 27/10; G11B 27/102; G11B 27/34; G11B 27/36;
(Continued)

(56) References Cited

U.S. PATENT DOCUMENTS 4,569,026 A   2/1986  Best
5,137,277 A   8/1992  Kitaue
(Continued)

FOREIGN PATENT DOCUMENTS

CA   2639491 A1   3/2010
DE   004038801 A1  6/1992
(Continued)

OTHER PUBLICATIONS

An ffmpeg and SDL Tutorial, "Tutorial 05: Synching Video," Retrieved from internet on Mar. 15, 2013: <http://dranger.com/ffmpeg/tutorial05.html>, (4 pages).
(Continued)

*Primary Examiner* — Thai Q Tran
*Assistant Examiner* — Stephen R Smith
(74) *Attorney, Agent, or Firm* — Goodwin Procter LLP

(57) ABSTRACT

Systems and methods for providing adaptive and responsive media are disclosed. In various implementations, a video for playback is received at a user device having a plurality of associated properties. Based on at least one of the properties, a first state of the video is configured, and the video is presented according to the first state. During playback of the video, a change in one of the device properties is detected, and the video is seamlessly transitioned to a second state based on the change.

18 Claims, 11 Drawing Sheets

(51) Int. Cl.
  *G11B 27/10* (2006.01)
  *H04N 21/845* (2011.01)
  *H04N 21/00* (2011.01)
  *H04N 21/8541* (2011.01)

(52) U.S. Cl.
  CPC ...... *G06F 2200/1614* (2013.01); *H04N 21/00* (2013.01); *H04N 21/8456* (2013.01); *H04N 21/8541* (2013.01)

(58) Field of Classification Search
  CPC ... G11B 27/031; G11B 27/034; G11B 27/105; H04N 21/00; H04N 21/8456; H04N 21/8541; H04N 19/107; H04N 21/234381; H04N 21/2387; H04N 21/42646; H04N 21/4307; H04N 21/4524; H04N 21/4532; H04N 21/47202; H04N 21/47205; H04N 21/47217; H04N 21/4758; H04N 21/6587; H04N 5/76; H04N 5/93; H04N 7/17336; H04N 9/8042; A63F 13/47
  USPC ........ 386/230, 223, 224, 241, 248; 345/156, 345/158, 659; 715/201; 348/564, 588; 375/240.26
  See application file for complete search history.

(56) References Cited

U.S. PATENT DOCUMENTS

| | | | |
|---|---|---|---|
| 5,161,034 A | 11/1992 | Klappert | |
| 5,568,602 A | 10/1996 | Callahan et al. | |
| 5,568,603 A | 10/1996 | Chen et al. | |
| 5,597,312 A | 1/1997 | Bloom et al. | |
| 5,607,356 A | 3/1997 | Schwartz | |
| 5,610,653 A | 3/1997 | Abecassis | |
| 5,636,036 A | 6/1997 | Ashbey | |
| 5,676,551 A | 10/1997 | Knight et al. | |
| 5,694,163 A | 12/1997 | Harrison | |
| 5,715,169 A | 2/1998 | Noguchi | |
| 5,734,862 A | 3/1998 | Kulas | |
| 5,737,527 A | 4/1998 | Shiels et al. | |
| 5,745,738 A | 4/1998 | Ricard | |
| 5,751,953 A | 5/1998 | Shiels et al. | |
| 5,754,770 A | 5/1998 | Shiels et al. | |
| 5,818,435 A | 10/1998 | Kozuka et al. | |
| 5,848,934 A | 12/1998 | Shiels et al. | |
| 5,887,110 A | 3/1999 | Sakamoto et al. | |
| 5,894,320 A | 4/1999 | Vancelette | |
| 5,956,037 A | 9/1999 | Osawa et al. | |
| 5,966,121 A | 10/1999 | Hubbell et al. | |
| 5,983,190 A | 11/1999 | Trower, II et al. | |
| 6,067,400 A | 5/2000 | Saeki et al. | |
| 6,091,886 A | 7/2000 | Abecassis | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,240,555 B1 | 5/2001 | Shoff et al. | |
| 6,298,020 B1 | 10/2001 | Kumagami | |
| 6,298,482 B1 | 10/2001 | Seidman et al. | |
| 6,460,036 B1 | 10/2002 | Herz | |
| 6,535,639 B1 | 3/2003 | Uchihachi et al. | |
| 6,657,906 B2 | 12/2003 | Martin | |
| 6,698,020 B1 | 2/2004 | Zigmond et al. | |
| 6,728,477 B1 | 4/2004 | Watkins | |
| 6,771,875 B1 | 8/2004 | Kunieda et al. | |
| 6,801,947 B1 | 10/2004 | Li | |
| 6,947,966 B1 | 9/2005 | Oko, Jr. et al. | |
| 7,085,844 B2 | 8/2006 | Thompson | |
| 7,155,676 B2 | 12/2006 | Land et al. | |
| 7,231,132 B1 | 6/2007 | Davenport | |
| 7,296,231 B2 | 11/2007 | Loui et al. | |
| 7,310,784 B1 | 12/2007 | Gottlieb et al. | |
| 7,319,780 B2 | 1/2008 | Fedorovskaya et al. | |
| 7,379,653 B2 | 5/2008 | Yap et al. | |
| 7,430,360 B2 | 9/2008 | Abecassis | |
| 7,444,069 B1 | 10/2008 | Bemsley | |
| 7,472,910 B1 | 1/2009 | Okada et al. | |
| 7,627,605 B1 | 12/2009 | Lamere et al. | |
| 7,650,623 B2 | 1/2010 | Hudgeons et al. | |
| 7,669,128 B2 | 2/2010 | Bailey et al. | |
| 7,694,320 B1 | 4/2010 | Yeo et al. | |
| 7,779,438 B2 | 8/2010 | Davies | |
| 7,787,973 B2 | 8/2010 | Lambert | |
| 7,917,505 B2 | 3/2011 | van Gent et al. | |
| 8,024,762 B2 | 9/2011 | Britt | |
| 8,046,801 B2 | 10/2011 | Ellis et al. | |
| 8,065,710 B2 | 11/2011 | Malik | |
| 8,151,139 B1 | 4/2012 | Gordon | |
| 8,176,425 B2 | 5/2012 | Wallace et al. | |
| 8,190,001 B2 | 5/2012 | Bemsley | |
| 8,202,167 B2 | 6/2012 | Ackley et al. | |
| 8,276,058 B2 | 9/2012 | Gottlieb et al. | |
| 8,281,355 B1 | 10/2012 | Weaver et al. | |
| 8,321,905 B1 | 11/2012 | Streeter et al. | |
| 8,341,662 B1 | 12/2012 | Bassett et al. | |
| 8,350,908 B2 | 1/2013 | Morris et al. | |
| 8,405,706 B2 | 3/2013 | Zhang et al. | |
| 8,600,220 B2 | 12/2013 | Bloch et al. | |
| 8,612,517 B1 | 12/2013 | Yadid et al. | |
| 8,626,337 B2 | 1/2014 | Corak et al. | |
| 8,646,020 B2 | 2/2014 | Reisman | |
| 8,650,489 B1 | 2/2014 | Baum et al. | |
| 8,667,395 B2 | 3/2014 | Hosogai et al. | |
| 8,750,682 B1* | 6/2014 | Nicksay ............. H04N 21/2743 386/248 |
| 8,752,087 B2 | 6/2014 | Begeja et al. | |
| 8,826,337 B2 | 9/2014 | Issa et al. | |
| 8,860,882 B2 | 10/2014 | Bloch et al. | |
| 8,930,975 B2 | 1/2015 | Woods et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,082,092 B1 | 7/2015 | Henry | |
| 9,094,718 B2 | 7/2015 | Barton et al. | |
| 9,190,110 B2 | 11/2015 | Bloch | |
| 9,257,148 B2 | 2/2016 | Bloch et al. | |
| 9,268,774 B2 | 2/2016 | Kim et al. | |
| 9,271,015 B2 | 2/2016 | Bloch et al. | |
| 9,363,464 B2 | 6/2016 | Alexander | |
| 9,367,196 B1 | 6/2016 | Goldstein et al. | |
| 9,374,411 B1 | 6/2016 | Goetz | |
| 9,390,099 B1 | 7/2016 | Wang et al. | |
| 9,456,247 B1 | 9/2016 | Pontual et al. | |
| 9,465,435 B1 | 10/2016 | Zhang et al. | |
| 9,473,582 B1 | 10/2016 | Fraccaroli | |
| 9,497,496 B1 | 11/2016 | Corley et al. | |
| 9,510,044 B1 | 11/2016 | Pereira et al. | |
| 9,520,155 B2 | 12/2016 | Bloch et al. | |
| 9,530,454 B2 | 12/2016 | Bloch et al. | |
| 9,531,998 B1 | 12/2016 | Farrell et al. | |
| 9,538,219 B2 | 1/2017 | Sakata et al. | |
| 9,554,061 B1 | 1/2017 | Proctor, Jr. et al. | |
| 9,571,877 B2 | 2/2017 | Lee et al. | |
| 9,607,655 B2 | 3/2017 | Bloch et al. | |
| 9,641,898 B2 | 5/2017 | Bloch et al. | |
| 9,653,115 B2 | 5/2017 | Bloch et al. | |
| 9,653,116 B2 | 5/2017 | Paulraj et al. | |
| 9,672,868 B2 | 6/2017 | Bloch et al. | |
| 9,715,901 B1 | 7/2017 | Singh et al. | |
| 9,736,503 B1 | 8/2017 | Bakshi et al. | |
| 9,792,026 B2 | 10/2017 | Bloch et al. | |
| 9,792,957 B2 | 10/2017 | Bloch et al. | |
| 9,826,285 B1 | 11/2017 | Mishra et al. | |
| 9,967,621 B2 | 5/2018 | Armstrong et al. | |
| 10,070,192 B2 | 9/2018 | Baratz | |
| 10,178,304 B1 | 1/2019 | Tudor et al. | |
| 10,178,421 B2 | 1/2019 | Thomas et al. | |
| 10,187,687 B2 | 1/2019 | Harb et al. | |
| 10,194,189 B1 | 1/2019 | Goetz et al. | |
| 10,257,572 B2 | 4/2019 | Manus et al. | |
| 10,257,578 B1 | 4/2019 | Bloch et al. | |

(56) References Cited

U.S. PATENT DOCUMENTS

| | | | |
|---|---|---|---|
| 10,310,697 B2 | 6/2019 | Roberts et al. | |
| 10,419,790 B2 | 9/2019 | Gersten | |
| 10,460,765 B2 * | 10/2019 | Bloch | G11B 27/102 |
| 10,523,982 B2 * | 12/2019 | Oyman | H04N 21/437 |
| 10,771,824 B1 | 9/2020 | Haritaoglu et al. | |
| 10,856,049 B2 | 12/2020 | Bloch et al. | |
| 11,003,748 B2 | 5/2021 | Oliker et al. | |
| 2001/0056427 A1 | 12/2001 | Yoon et al. | |
| 2002/0019799 A1 | 2/2002 | Ginsberg et al. | |
| 2002/0029218 A1 | 3/2002 | Bentley et al. | |
| 2002/0053089 A1 | 5/2002 | Massey | |
| 2002/0086724 A1 | 7/2002 | Miyaki et al. | |
| 2002/0089523 A1 | 7/2002 | Hodgkinson | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0120931 A1 | 8/2002 | Huber et al. | |
| 2002/0124250 A1 | 9/2002 | Proehl et al. | |
| 2002/0129374 A1 | 9/2002 | Freeman et al. | |
| 2002/0140719 A1 | 10/2002 | Amir et al. | |
| 2002/0144262 A1 | 10/2002 | Plotnick et al. | |
| 2002/0174430 A1 | 11/2002 | Ellis et al. | |
| 2002/0177914 A1 | 11/2002 | Chase | |
| 2002/0194595 A1 | 12/2002 | Miller et al. | |
| 2003/0007560 A1 | 1/2003 | Mayhew et al. | |
| 2003/0012409 A1 | 1/2003 | Overton et al. | |
| 2003/0020744 A1 | 1/2003 | Ellis et al. | |
| 2003/0023757 A1 | 1/2003 | Ishioka et al. | |
| 2003/0069057 A1 | 4/2003 | DeFrees-Parrott | |
| 2003/0076347 A1 | 4/2003 | Barrett et al. | |
| 2003/0101164 A1 | 5/2003 | Pic et al. | |
| 2003/0148806 A1 | 8/2003 | Weiss | |
| 2003/0159566 A1 | 8/2003 | Safer et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0009813 A1 | 1/2004 | Wind | |
| 2004/0019905 A1 | 1/2004 | Fellenstein et al. | |
| 2004/0034711 A1 | 2/2004 | Hughes | |
| 2004/0070595 A1 | 4/2004 | Atlas et al. | |
| 2004/0091848 A1 | 5/2004 | Nemitz | |
| 2004/0125124 A1 | 7/2004 | Kim et al. | |
| 2004/0128317 A1 | 7/2004 | Sull et al. | |
| 2004/0138948 A1 | 7/2004 | Loomis | |
| 2004/0146275 A1 | 7/2004 | Takata et al. | |
| 2004/0172476 A1 | 9/2004 | Chapweske | |
| 2004/0194128 A1 | 9/2004 | McIntyre et al. | |
| 2004/0194131 A1 | 9/2004 | Ellis et al. | |
| 2004/0199923 A1 | 10/2004 | Russek | |
| 2004/0261127 A1 | 12/2004 | Freeman et al. | |
| 2005/0019015 A1 | 1/2005 | Ackley et al. | |
| 2005/0028193 A1 | 2/2005 | Candelore et al. | |
| 2005/0055377 A1 | 3/2005 | Dorey et al. | |
| 2005/0091597 A1 | 4/2005 | Ackley | |
| 2005/0102707 A1 | 5/2005 | Schnitman | |
| 2005/0107159 A1 | 5/2005 | Sato | |
| 2005/0120389 A1 | 6/2005 | Boss et al. | |
| 2005/0132401 A1 | 6/2005 | Boccon-Gibod et al. | |
| 2005/0166224 A1 | 7/2005 | Ficco | |
| 2005/0198661 A1 | 9/2005 | Collins et al. | |
| 2005/0210145 A1 | 9/2005 | Kim et al. | |
| 2005/0240955 A1 | 10/2005 | Hudson | |
| 2005/0251820 A1 | 11/2005 | Stefanik et al. | |
| 2005/0251827 A1 | 11/2005 | Ellis et al. | |
| 2005/0289582 A1 | 12/2005 | Tavares et al. | |
| 2006/0002895 A1 | 1/2006 | McDonnell et al. | |
| 2006/0024034 A1 | 2/2006 | Filo et al. | |
| 2006/0028951 A1 | 2/2006 | Tozun et al. | |
| 2006/0064733 A1 | 3/2006 | Norton et al. | |
| 2006/0080167 A1 | 4/2006 | Chen et al. | |
| 2006/0089843 A1 | 4/2006 | Flather | |
| 2006/0120624 A1 | 6/2006 | Jojic et al. | |
| 2006/0130121 A1 | 6/2006 | Candelore et al. | |
| 2006/0150072 A1 | 7/2006 | Salvucci | |
| 2006/0150216 A1 | 7/2006 | Herz et al. | |
| 2006/0153537 A1 * | 7/2006 | Kaneko | G11B 27/105 386/271 |
| 2006/0155400 A1 | 7/2006 | Loomis | |
| 2006/0200842 A1 | 9/2006 | Chapman et al. | |
| 2006/0212904 A1 | 9/2006 | Klarfeld et al. | |
| 2006/0222322 A1 | 10/2006 | Levitan | |
| 2006/0224260 A1 | 10/2006 | Hicken et al. | |
| 2006/0253330 A1 | 11/2006 | Maggio et al. | |
| 2006/0274828 A1 | 12/2006 | Siemens et al. | |
| 2007/0003149 A1 | 1/2007 | Nagumo et al. | |
| 2007/0018980 A1 | 1/2007 | Berteig et al. | |
| 2007/0024706 A1 | 2/2007 | Brannon et al. | |
| 2007/0028272 A1 | 2/2007 | Lockton | |
| 2007/0033633 A1 | 2/2007 | Andrews et al. | |
| 2007/0055989 A1 | 3/2007 | Shanks et al. | |
| 2007/0079325 A1 | 4/2007 | de Heer | |
| 2007/0085759 A1 | 4/2007 | Lee et al. | |
| 2007/0099684 A1 | 5/2007 | Butterworth | |
| 2007/0101369 A1 | 5/2007 | Dolph | |
| 2007/0118801 A1 | 5/2007 | Harshbarger et al. | |
| 2007/0154169 A1 | 7/2007 | Cordray et al. | |
| 2007/0157234 A1 | 7/2007 | Walker | |
| 2007/0157260 A1 | 7/2007 | Walker | |
| 2007/0157261 A1 | 7/2007 | Steelberg et al. | |
| 2007/0162395 A1 | 7/2007 | Ben-Yaacov et al. | |
| 2007/0180488 A1 | 8/2007 | Walter et al. | |
| 2007/0220583 A1 | 9/2007 | Bailey et al. | |
| 2007/0226761 A1 | 9/2007 | Zalewski et al. | |
| 2007/0239754 A1 | 10/2007 | Schnitman | |
| 2007/0253677 A1 | 11/2007 | Wang | |
| 2007/0253688 A1 | 11/2007 | Koennecke | |
| 2007/0263722 A1 | 11/2007 | Fukuzawa | |
| 2008/0001956 A1 | 1/2008 | Markovic et al. | |
| 2008/0019445 A1 | 1/2008 | Aono et al. | |
| 2008/0021187 A1 | 1/2008 | Wescott et al. | |
| 2008/0021874 A1 | 1/2008 | Dahl et al. | |
| 2008/0022320 A1 | 1/2008 | Ver Steeg | |
| 2008/0031595 A1 | 2/2008 | Cho | |
| 2008/0086456 A1 | 4/2008 | Rasanen et al. | |
| 2008/0086754 A1 | 4/2008 | Chen et al. | |
| 2008/0091721 A1 | 4/2008 | Harboe et al. | |
| 2008/0092159 A1 | 4/2008 | Dmitriev et al. | |
| 2008/0139301 A1 | 6/2008 | Holthe | |
| 2008/0148152 A1 | 6/2008 | Blinnikka et al. | |
| 2008/0161111 A1 | 7/2008 | Schuman | |
| 2008/0170687 A1 | 7/2008 | Moors et al. | |
| 2008/0177893 A1 | 7/2008 | Bowra et al. | |
| 2008/0178232 A1 | 7/2008 | Velusamy | |
| 2008/0238938 A1 | 10/2008 | Eklund et al. | |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0022165 A1 | 1/2009 | Candelore et al. | |
| 2009/0024923 A1 | 1/2009 | Hartwig et al. | |
| 2009/0027337 A1 | 1/2009 | Hildreth | |
| 2009/0029771 A1 | 1/2009 | Donahue | |
| 2009/0055880 A1 | 2/2009 | Batteram et al. | |
| 2009/0063681 A1 | 3/2009 | Ramakrishnan et al. | |
| 2009/0063995 A1 | 3/2009 | Baron et al. | |
| 2009/0077137 A1 | 3/2009 | Weda et al. | |
| 2009/0079663 A1 | 3/2009 | Chang et al. | |
| 2009/0083631 A1 | 3/2009 | Sidi et al. | |
| 2009/0116817 A1 | 5/2009 | Kim et al. | |
| 2009/0131764 A1 | 5/2009 | Lee et al. | |
| 2009/0133051 A1 | 5/2009 | Hildreth | |
| 2009/0133071 A1 | 5/2009 | Sakai et al. | |
| 2009/0138805 A1 | 5/2009 | Hildreth | |
| 2009/0177538 A1 | 7/2009 | Brewer et al. | |
| 2009/0178089 A1 | 7/2009 | Picco et al. | |
| 2009/0191971 A1 | 7/2009 | Avent | |
| 2009/0195652 A1 | 8/2009 | Gal | |
| 2009/0199697 A1 | 8/2009 | Lehtiniemi et al. | |
| 2009/0210790 A1 | 8/2009 | Thomas | |
| 2009/0226046 A1 | 9/2009 | Shteyn | |
| 2009/0228572 A1 | 9/2009 | Wall et al. | |
| 2009/0254827 A1 | 10/2009 | Gonze et al. | |

(56) References Cited

U.S. PATENT DOCUMENTS

| | | |
|---|---|---|
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1* | 7/2011 | Frojdh ............... H04N 21/4223 |
| | | 375/240.26 |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | Van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1* | 6/2012 | Kasai ............... H04N 21/2343 |
| | | 375/240.03 |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1* | 5/2013 | Feinson ............... H04N 13/167 |
| | | 386/223 |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1* | 8/2013 | Arrasvuori ............... H04N 5/77 |
| | | 386/224 |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1* | 9/2013 | Hannuksela ......... H04N 19/114 |
| | | 348/43 |
| 2013/0235270 A1* | 9/2013 | Sasaki ............... H04N 21/44012 |
| | | 348/564 |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1* | 10/2013 | Arrasvuori ......... H04N 21/4383 |
| | | 715/201 |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |

(56) References Cited

U.S. PATENT DOCUMENTS

| | | |
|---|---|---|
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1* | 7/2014 | Caissy .................. G06F 3/0338 345/659 |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1* | 3/2015 | Silverman ........ H04N 21/47205 386/241 |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0074721 A1 | 3/2015 | Fishman et al. |
| 2015/0104144 A1 | 4/2015 | Minemura |
| 2015/0104155 A1 | 4/2015 | Bloch et al. |
| 2015/0106845 A1 | 4/2015 | Popkiewicz et al. |
| 2015/0124171 A1* | 5/2015 | King ................ H04N 21/21805 348/588 |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1 | 8/2015 | Cabanero |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0310660 A1 | 10/2015 | Mogilefsky et al. |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1 | 1/2016 | Zito, Jr. |
| 2016/0029002 A1 | 1/2016 | Balko |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1* | 6/2016 | Kilar .................. H04N 21/4516 725/12 |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0344873 A1 | 11/2016 | Jenzeh et al. |
| 2016/0365117 A1 | 12/2016 | Boliek et al. |
| 2017/0006322 A1 | 1/2017 | Dury et al. |
| 2017/0032562 A1 | 2/2017 | Block et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |
| 2017/0195736 A1 | 7/2017 | Chai et al. |
| 2017/0264920 A1 | 9/2017 | Mickelsen |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0060430 A1 | 3/2018 | Lu |
| 2018/0068019 A1 | 3/2018 | Novikoff et al. |
| 2018/0095645 A1 | 4/2018 | Subudhi et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0300852 A1 | 10/2018 | Chen et al. |
| 2018/0300858 A1 | 10/2018 | Chen et al. |
| 2018/0310049 A1* | 10/2018 | Takahashi ................ H04S 5/02 |
| 2018/0314959 A1 | 11/2018 | Apokatanidis et al. |
| 2018/0376205 A1 | 12/2018 | Oswal et al. |
| 2019/0005716 A1 | 1/2019 | Singh et al. |
| 2019/0066188 A1 | 2/2019 | Rothschild |
| 2019/0069038 A1 | 2/2019 | Phillips |
| 2019/0069039 A1 | 2/2019 | Phillips |
| 2019/0075367 A1 | 3/2019 | van Zessen et al. |

(56) References Cited

U.S. PATENT DOCUMENTS

| | | |
|---|---|---|
| 2019/0090002 A1 | 3/2019 | Ramadorai et al. |
| 2019/0098371 A1 | 3/2019 | Keesan |
| 2019/0104342 A1 | 4/2019 | Catalano et al. |
| 2019/0132639 A1 | 5/2019 | Panchaksharaiah et al. |
| 2019/0139314 A1 | 5/2019 | Marsh et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0335225 A1 | 10/2019 | Fang et al. |
| 2019/0354936 A1 | 11/2019 | Deluca et al. |
| 2020/0023157 A1 | 1/2020 | Lewis et al. |
| 2020/0029128 A1 | 1/2020 | Erskine |
| 2020/0037047 A1 | 1/2020 | Cheung et al. |
| 2020/0059699 A1 | 2/2020 | Malev et al. |
| 2020/0169787 A1 | 5/2020 | Pearce et al. |
| 2020/0193163 A1 | 6/2020 | Chang et al. |
| 2020/0344508 A1 | 10/2020 | Edwards et al. |
| 2021/0263564 A1 | 8/2021 | Chen et al. |
| 2022/0046291 A1 | 2/2022 | Jiang et al. |
| 2022/0245209 A1 | 8/2022 | Cho et al. |

FOREIGN PATENT DOCUMENTS

| | | | |
|---|---|---|---|
| DE | 10053720 | A1 | 4/2002 |
| EP | 0965371 | A2 | 12/1999 |
| EP | 1033157 | A2 | 9/2000 |
| EP | 2104105 | A1 | 9/2009 |
| GB | 2359916 | A | 9/2001 |
| GB | 2428329 | A | 1/2007 |
| JP | 2003-245471 | A | 9/2003 |
| JP | 2008005288 | A | 1/2008 |
| KR | 2004-0005068 | A | 1/2004 |
| KR | 2010-0037413 | A | 4/2010 |
| WO | WO-1996013810 | A1 | 5/1996 |
| WO | WO-2000/059224 | A1 | 10/2000 |
| WO | WO-2007/062223 | A2 | 5/2007 |
| WO | WO-2007/138546 | A2 | 12/2007 |
| WO | WO-2008/001350 | A2 | 1/2008 |
| WO | WO-2008/052009 | A2 | 5/2008 |
| WO | WO-2008/057444 | A2 | 5/2008 |
| WO | WO-2009/125404 | A2 | 10/2009 |
| WO | WO-2009/137919 | A1 | 11/2009 |

OTHER PUBLICATIONS

Archos Gen 5 English User Manual Version 3.0, Jul. 26, 2007, pp. 1-81.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
International Search Report for International Patent Application PCT/IL2010/000362 dated Aug. 25, 2010 (2 pages).
International Search Report and Written Opinion for International Patent Application PCT/IB2013/001000 dated Jul. 31, 2013 (12 pages).
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-8).
Sodagar, I., (2011) "The MPEG-DASH Standard for Multimedia Streaming Over the Internet", IEEE Multimedia, IEEE Service Center, New York, NY US, vol. 18, No. 4, pp. 62-67.
Supplemental European Search Report for EP10774637.2 (PCT/IL2010/000362) dated Jun. 28, 2012 (6 pages).
Supplemental European Search Report for EP13184145 dated Jan. 30, 2014 (6 pages).
Yang, H, et al., "Time Stamp Synchronization in Video Systems," Teletronics Technology Corporation, <http://www.ttcdas.com/products/daus_encoders/pdf/_tech_papers/tp_2010_time_stamp_video_system.pdf>, Abstract, (8 pages).
Bartlett, "iTunes 11: How to Queue Next Song," Technipages, Oct. 6, 2008, pp. 1-8, Retrieved from the Internet on Dec. 26, 2013, http://www.technipages.com/itunes-queue-next-song.html.
U.S. Appl. No. 13/622,780 8,860,882 Published as US2014/0078397, Systems and Methods for Constructing Multimedia Content Modules, filed Sep. 19, 2012.
U.S. Appl. No. 15/356,913, Systems and Methods for Real-Time Pixel Switching, filed Nov. 21, 2016.
U.S. Appl. No. 16/986,977, Systems and Methods for Creating Linear Video From Branched Video, filed Aug. 6, 2020.
U.S. Appl. No. 14/534,626 Published as US-2018-0130501-A1, Systems and Methods for Dynamic Video Bookmarking, filed Sep. 13, 2017.
U.S. Appl. No. 16/752,193, Systems and Methods for Nonlinear Video Playback Using Linear Real-Time Video Players, filed Jan. 24, 2020.
U.S. Appl. No. 14/978,491 Published as US2017/0178409, Seamless Transitions in Large-Scale Video, filed Dec. 22, 2015.
U.S. Appl. No. 15/395,477 Published as US2018/0191574, Systems and Methods for Dynamic Adaptation and User Profiling of Branched Video Paths, filed Dec. 30, 2016.
U.S. Appl. No. 16/283,066 Published as US2019/0349637, Dynamic Library Display for Interactive, filed Feb. 22, 2019.
U.S. Appl. No. 17/091,149, filed Dynamic Library Display for Interactive Videos, filed Nov. 6, 2020.
U.S. Appl. No. 13/033,916, now U.S. Pat. No. 9,190,110, the Office Actions dated Apr. 26, 2012, Aug. 17, 2012, Mar. 28, 2013, Jun. 20, 2013, Jan. 3, 2014, Jul. 7, 2014, and Dec. 19, 2014; the Notices of Allowance dated Jun. 19, 2015, Jul. 17, 2015, Jul. 29, 2015, Aug. 12, 2015, and Sep. 14, 2015.
U.S. Appl. No. 14/884,284, the Office Actions dated Sep. 8, 2017; May 18, 2018; Dec. 14, 2018; Jul. 25, 2019; Nov. 18, 2019 and Feb. 21, 2020;
U.S. Appl. No. 13/033,916, now U.S. Pat. No. 9,607,655, the Office Actions dated Jun. 7, 2013, Jan. 2, 2014, Aug. 28, 2014, Jan. 5, 2015, Jul. 9, 2015, and Jan. 5, 2016; the Advisory Action dated May 11, 2016; and the Notice of Allowance dated Dec. 21, 2016.
U.S. Appl. No. 13/034,645, the Office Actions dated Jul. 23, 2012, Mar. 21, 2013, Sep. 15, 2014, Jun. 4, 2015, Apr. 7, 2017, Oct. 6, 2017, Aug. 10, 2018, Jul. 5, 2016, Apr. 5, 2019, Dec. 26, 2019.
U.S. Appl. No. 13/437,164, now U.S. Pat. No. 8,600,220, the Notice of Allowance dated Aug. 9, 2013.
U.S. Appl. No. 14/069,694, now U.S. Pat. No. 9,271,015, the Office Actions dated Apr. 27, 2015 and Aug. 31, 2015, the Notice of Allowance dated Oct. 13, 2015.
U.S. Appl. No. 13/622,780, now U.S. Pat. No. 8,860,882, the Office Action dated Jan. 16, 2014, the Notice of Allowance dated Aug. 4, 2014.
U.S. Appl. No. 13/622,795, now U.S. Pat. No. 9,009,619, the Office Actions dated May 23, 2014 and Dec. 1, 2014, the Notice of Allowance dated Jan. 9, 2015.
U.S. Appl. No. 14/639,579, now U.S. Pat. No. 10,474,334, the Office Actions dated May 3, 2017, Nov. 22, 2017, and Jun. 26, 2018, the Notics of Allowance dated Feb. 8, 2019 and Jul. 11, 2019.
U.S. Appl. No. 13/838,830, now U.S. Pat. No. 9,257,148, the Office Action dated May 7, 2015, Notices of Allowance dated Nov. 6, 2015.
U.S. Appl. No. 14/984,821, now U.S. Pat. No. 10,418,066, the Office Actions dated Jun. 1, 2017, Dec. 6, 2017, and Oct. 5, 2018; the Notice of Allowance dated May 7, 2019.
U.S. Appl. No. 13/921,536, now U.S. Pat. No. 9,832,516, the Office Actions dated Feb. 25, 2015, Oct. 20, 2015, Aug. 26, 2016 and Mar. 8, 2017, the Advisory Action dated Jun. 21, 2017, and Notice of Allowance dated Sep. 12, 2017.
U.S. Appl. No. 14/107,600, now U.S. Pat. No. 10,448,119, the Office Actions dated Dec. 19, 2014, Jul. 8, 2015, Jun. 3, 2016, Mar. 8, 2017, Oct. 10, 2017, Jul. 25, 2018, and the Notices of Allowance dated dated Dec. 31, 2018 and Apr. 25, 2019.

(56) References Cited

OTHER PUBLICATIONS

U.S. Appl. No. 14/335,831, now U.S. Pat. No. 9,530,454, the Office Action dated Feb. 12, 2016, Notices of Allowance dated Aug. 24, 2016.
U.S. Appl. No. 14/139,996, now U.S. Pat. No. 9,641,898, the Office Actions dated Jun. 18, 2015, Feb. 3, 2016, May 4, 2016; and the Notice of Allowance dated Dec. 23, 2016.
U.S. Appl. No. 14/140,007, now U.S. Pat. No. 9,520,155, the Office Actions dated Sep. 8, 2015 and Apr. 26, 2016; and the Notice of Allowance dated Oct. 11, 2016.
U.S. Appl. No. 14/249,627, now U.S. Pat. No. 9,653,115, the Office Actions dated Jan. 14, 2016 and Aug. 9, 2016; and the Notice of Allowance Jan. 13, 2017.
U.S. Appl. No. 15/481,916, the Office Actions dated Oct. 6, 2017, Aug. 6, 2018, Mar. 8, 2019, Nov. 27, 2019, and the Notice of Allowance dated Apr. 21, 2020.
U.S. App. No. 14/249,665, now U.S. Pat. No. 9,792,026, the Office Actions dated May 16, 2016 and Feb. 22, 2017; and the Notices of Allowance dated Jun. 2, 2017 and Jul. 24, 2017.
U.S. Appl. No. 14/509,700, now U.S. Patent No. 9,792,957, the Office Action dated Oct. 28, 2016; and the Notice of Allowance dated Jun. 15, 2017.
U.S. Appl. No. 15/703,462, the Office Action datled Jun. 21, 2019, and Dec. 27, 2019; and the Notice of Allowance dated Feb. 10, 2020.
U.S. Appl. No. 14/534,626, the Office Actions dated Nov. 25, 2015, Jul. 5, 2016, Jun. 5, 2017, Mar. 2, 2018, Sep. 26, 2018, May 8, 2019, Dec. 27, 2019; and Aug. 19, 2020.
U.S. Appl. No. 14/700,845, now U.S. Pat. No. 9,653,115, the Office Actions dated May 20, 2016, Dec. 2, 2016, May 22, 2017, Nov. 28, 2017, Jun. 27, 2018 and Feb. 19, 2019 and the Notice of Allowance dated Oct. 21, 2019.
U.S. Appl. No. 14/,700,862, now U.S. Pat. No. 9,672,868, the Office Action dated Aug. 26, 2016; and the Notice of Allowance dated Mar. 9, 2017.
U.S. Appl. No. 14/835,857, now U.S. Pat. No. 10,460,765, the Office Actions dated Sep. 23, 2016, Jun. 5, 2017 and Aug. 9, 2018, and the Advisory Action dated Oct. 20, 2017; Notice of Allowances dated Feb. 25, 2019 and Jun. 7, 2019.
U.S. Appl. No. 16/800,994, the Office Action dated Apr. 15, 2020.
U.S. Appl. No. 14/978,464, the Office Actions dated Jul. 25, 2019, Dec. 14, 2018, May 18, 2018, Sep. 8, 2017, Dec. 14, 2018, Jul. 25, 2019, Nov. 18, 2019, Jul. 23, 2020.
U.S. Appl. No. 14/978,491, the Office Actions dated Sep. 8, 2017, May 25, 2018, Dec. 14, 2018, Aug. 12, 2019; Dec. 23, 2019; and Jul. 23, 2020.
U.S. Appl. No. 15/085,209, now U.S. Pat. No. 10,462,202, the Office Actions dated Feb. 26, 2018 and Dec. 31, 2018; the Notice of Allowance dated Aug. 12, 2019.
U.S. Appl. No. 15/165,373, the Office Actions dated Mar. 24, 2017, Oct. 11, 2017, May 18, 2018; Feb. 1, 2019, Aug. 8, 2019, and Jan. 3, 2020.
U.S. Appl. No. 15/189,931, now U.S. Pat. No. 10,218,760, the Office Actions dated Apr. 6, 2018, Notice of Allowance dated Oct. 24, 2018.
U.S. Appl. No. 15/395,477, the Office Actions datled Nov. 2, 2018, Aug. 16, 2019, and Apr. 15, 2019.
U.S. Appl. No. 15/997,284, the Office Actions dated Aug. 1, 2019, Nov. 21, 2019 and Apr. 28, 2020.
U.S. Appl. No. 15/863,191, now U.S. Pat. No. 10,257,578, the Notices of Allowance dated Jul. 5, 2018 and Nov. 23, 2018.
U.S. Appl. No. 16/591,103, the Office Action dated Apr. 22, 2020.
U.S. Appl. No. 13/034,645 Published as US2011/0202562, System and Method for Data Mining Within Interactive Multimedia, filed Feb. 24, 2011.
U.S. Appl. No. 13/437,164 U.S. Pat. No. 8,600,220 Published as US2013/0259442, Systems and Methods for Loading More Than One Video Content at a Time, Apr. 2, 2012.
U.S. Appl. No. 15/481,916 Published as US 2017-0345460, Systems and Methods for Creating Linear Video From Branched Video, filed Apr. 7, 2017.
U.S. Appl. No. 14/534,626 Published as US-2018-0130501-A1, Systems and Methods for Dynamic Vidco Bookmarking, filed Sep. 13, 2017.
U.S. Appl. No. 16/865,896, Systems and Methods for Dynamic Video Bookmarking, filed May 4, 2020.
U.S. Appl. No. 17/138,434, Systems and Methods for Dynamic Video Bookmarking, filed Dec. 30, 2020.
U.S. Appl. No. 16/752,193 Published as U52020/0404382, Systems and Methods for Nonlinear Video Playback Using Linear Real-Time Video Players, filed Jan. 24, 2020.
U.S. Appl. No. 16/800,994, Systems and Methods for Adaptive and Responsive Video, filed Feb. 25, 2020.
U.S. Appl. No. 14/978,464 Published as US2017/0178601, Intelligent Buffering of Large-Scale Video, filed Dec. 22, 2015.
U.S. Appl. No. 17/403,703, Seamless Transitions in Large-Scale Video, filed Aug. 16, 2021.
U.S. Appl. No. 15/165,373 Published as US 2017-0295410, Video Symbiotic Interactive, filed May 26, 2016.
U.S. Appl. No. 17/328,261, Systems and Methods for Dynamic Weighting of Branched Video Paths, filed May 24, 2021.
U.S. Appl. No. 17/091,149, Dynamic Library Display for Interactive Videos, filed Nov. 6, 2020.
U.S. Appl. No. 16/591,103, Systems and Methods for Dynamically Adjusting Video Aspect Ratios, filed Oct. 2, 2019.
U.S. Appl. No. 16/793,205, Dynamic Adaptation of Interactive Video Players Using Behavioral Analytics, filed Feb. 18, 2020.
U.S. Appl. No. 16/793,201, Systems and Methods for Detecting Anomalous Activities for Interactive Videos, filed Feb. 18, 2020.
U.S. Appl. No. 16/922,540, Systems and Methods for Seamless Audio and Video Endpoint Transitions, filed Jul. 7, 2020.
Google Scholar search, "Inserting metadata inertion advertising video", Jul. 16, 2021, 2 pages.
International Preliminary Report and Written Opinion of PCT/IL2012/000080 dated Aug. 27, 2013, 7 pages.
Marciel, M. et al., "Understanding the Detection of View Fraud in Video Content Portals", (Feb. 5, 2016), Cornell University, pp. 1-13.
U.S. Appl. No. 14/884,285 Published as US2017/0178601, Systems and Method for Assembling a Recorded Composition, filed Oct. 15, 2015.
U.S. Appl. No. 17/138,434 Published as US2021/0366520, Systems and Methods for Dynamic Video Bookmarking, filed Dec. 30, 2020.
U.S. Appl. No. 17/701,168, Systems and Methods for Dynamic Video Bookmarking, filed Mar. 22, 2022.
U.S. Appl. No. 14/534,626 Published as US2016/0105724, Systems and Methods for Parallel Track Transitions, filed Nov. 6, 2014.
U.S. Appl. No. 15/165,373 Published as US2017/0295410, Symbiotic Interactive Video, filed May 26, 2016.
U.S. Appl. No. 15/395,477 Published as US2021/0281626, Systems and Methods for Dynamic Weighting of Branched Video Paths, filed Dec. 30, 2016.
U.S. Appl. No. 15/997,284 Published as U52019/0373330, Interactive Video Dynamic Adaptation and User Profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 17/091,149 Published as US2021/0306707, Dynamic Library Display for Interactive Videos, filed Nov. 6, 2020.
U.S. Appl. No. 16/793,201 Published as US2021/0258640, Systems and Methods for Detecting Anomalous Activities for Interactive Videos, filed Feb. 18, 2020.
U.S. Appl. No. 17/462,199, Shader-based dynamic video manipulation, filed Aug. 31, 2021.
U.S. Appl. No. 12/706,721 U.S. Pat. No. 9,190,110 Published as US2010/0293455, System and Method for Assembling a Recorded Composition, filed Feb. 17, 2010.
U.S. Appl. No. 14/884,285 U.S. Pat. No. 11,314,936 Published as US2017/0178601, Systems and Method for Assembling a Recorded Composition, filed Oct. 15, 2015.

(56) References Cited

OTHER PUBLICATIONS

U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 U.S. Pat. No. 11,232,458 Published as US2011/0202562, System and Method for Data Mining Within Interactive Multimedia, filed Feb. 24, 2011.
U.S. Appl. No. 17/551,847 Published as US2021/0366520, Systems and Methods for Data Mining Within Interactive Multimedia, filed Dec. 15, 2021.
U.S. Appl. No. 13/437,164 U.S. Pat. No. 8,600,220 Published as US2013/0259442, Systems and Methods for Loading More Than One Video Content at a Time, filed Apr. 2, 2012.
U.S. Appl. No. 14/069,694 U.S. Pat. No. 9,271,015, Published as US2014/0178051 Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branched Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.
U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,448,119 Published as US2015/0067723, Methods and Systems for Unfolding Video Pre-Roll, filed Dec. 16, 2013.
U.S. Appl. No. 14/335,381 U.S. Pat. No. 9,530,454 Published as US2015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015-0294685, Video Systems and Methods for Creating Linear Video From Branched, filed Apr. 10, 2014.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 16/986,977 Published as US2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,957 Published as US2016/0104513, Systems and Methods for Dynamic Video Bookmarking, filed Oct. 8, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US2020/0265870, Systems and Methods for Dynamic Video Bookmarking, filed May 4, 2020.
U.S. Appl. No. 17/138,434 U.S. Pat. No. 11,348,618 Published as US2021/0366520, Systems and Methods for Dynamic Video Bookmarking, filed Dec. 30, 2020.
U.S. Appl. No. 17/701,168 Published as US2022/0215861, Systems and Methods for Dynamic Video Bookmarking, filed Mar. 22, 2022.
U.S. Appl. No. 14/534,626 Published as US2016/0105724, Systems and Methods for Parallel Track Transitions, filed Mar. 31, 2022.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 14/978,464 U.S. Pat. No. 11,164,548 Published as US2017/0178601, Intelligent Buffering of Large-Scale Video, filed Dec. 22, 2015.
U.S. Appl. No. 14/978,491 U.S. Pat No. 11,128,853 Published as US2017/0178409, Seamless Transitions in Large-Scale Video, filed Dec. 22, 2015.
U.S. Appl. No. 17/403,703 Published as US2022/0038673, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.
U.S. Appl. No. 15/165,373 Published as US2017/0295410, Symbiotic Interactive May 26, 2016.
U.S. Appl. No. 15/189,931 U.S. Pat. No. 10,218,760 Published as US2017/0374120, Dynamic Summary Generation for Realtime Switchable Videos, filed Jun. 22, 2016.
U.S. Appl. No. 15/395,477 U.S. Pat. No. 11,050,809 Published as US2018/0191574, Systems and Methods for Dynamic Weighting of Branched Video Paths, filed Dec. 30, 2016.
U.S. Appl. No. 17/328,261 Published as US2021/0281626, Systems and Methods for Dynamic Weighting of Branched Video Paths, filed May 24, 2021.
U.S. Appl. No. 15/997,284 Published as US2019/0373330, Interactive Video Dynamic Adaptation and User Profiling, filed Jun. 4, 2018.
U.S. Appl. No. 15/863,191 10,257,578 Dynamic Library Display for Interactive Videos, filed Jan. 5, 2018.
U.S. Appl. No. 16/283,066 U.S. Pat. No. 10,856,049 Published as US2019/0349637, Dynamic Library Display for Interactive Videos, filed Feb. 22, 2019.
U.S. Appl. No. 17/091,149 U.S. Pat. No. 11,528,534, Dynamic Library Display for Interactive Videos, filed Nov. 6, 2020.
U.S. Appl. No. 16/591,103 Published as US2021/0105433, Systems and Methods for Dynamically Adjusting Video Aspect Ratios, filed Oct. 2, 2019.
U.S. Appl. No. 16/793,205 Published as US2021/0258647, Dynamic adaptation of interactive video players using behavioral analytics, filed Feb. 18, 2020.
U.S. Appl. No. 16/793,201 U.S. Pat. No. 11,245,961 Published as US2021/0258640, Systems and Methods for Detecting Anomalous Activities for Interactive Videos, filed Feb. 18, 2020.
U.S. Appl. No. 16/922,540 Published as US2022/0014817, Systems and Methods for Seamless Audio and Video Endpoint Transitions, filed Jul. 7, 2020.
U.S. Appl. No. 17/462,199 Published as US2019/0392868, Shader-based dynamic video manipulation, filed Aug. 31, 2021.
U.S. Appl. No. 17/462,222, Shader-based dynamic video manipulation, filed Aug. 31, 2021.
U.S. Appl. No. 17/334,027, Automated platform for generating interactive videos, filed May 28, 2021.
U.S. Appl. No. 17/484,604 Discovery engine for interactive videos, filed Sep. 24, 2021.
U.S. Appl. No. 17/484,635, Video player integration within websites, filed Sep. 24, 2021.

(56) References Cited

OTHER PUBLICATIONS

Bodaghi, A. et al., "Personalization of Interactive Recommender Systems for Expert Users", 4th International Conference on the Web Research (ICWR), (2018), pp. 58-62.

* cited by examiner

SYSTEMS AND METHODS FOR ADAPTIVE AND RESPONSIVE VIDEO

CROSS-REFERENCE TO RELATED APPLICATION

This application is a continuation of U.S. patent application Ser. No. 14/835,857, titled "Systems and methods for adaptive and responsive video" and filed on Aug. 26, 2015 under Attorney Docket No. ITU-017, which is hereby incorporated by reference herein in its entirety.

FIELD OF THE INVENTION

The present disclosure relates generally to dynamic video and, more particularly, to systems and methods for dynamically modifying a video state based on changes in user device properties.

BACKGROUND

The rise of the mobile web and the vast increase in different platforms and devices with different screen sizes, resolutions, and orientations, have necessitated various new techniques in web design, such as enabling a website to display differently according to the device or screen it is displayed on. These capabilities are supported by standards like HyperText Markup Language (HTML), Cascading Style Sheets (CSS), and JavaScript, which enable designers and developers to implement responsive and adaptive websites.

However, the responsive and adaptive features used in website design do not similarly apply to video presentations. Digital videos have fixed resolutions, fixed proportions, and fixed content. Dynamic changes to digital video are limited to adaptations in video size and quality to accommodate, for example, different device screen sizes or available communications bandwidth. However, such changes have their own disadvantages. For example, videos scaled to fit a screen size having a different aspect ratio are typically cropped, which results in a loss of content, or are letterboxed, with mattes abutting the video.

SUMMARY

Systems and methods for responsive and adaptive video are described. In general, the present disclosure describes a "smart video response" technique, in which video content (streaming or otherwise) can adapt in real-time, with targeted, customized, or other responsive content, to changes in properties associated with a user device, all without scaling, letterboxing, or other noted disadvantages of the prior art.

Accordingly, in one aspect a video for playback is received at a user device having a plurality of identified associated properties. The device properties can include, for example, physical orientation, model, physical screen size, screen resolution, and window size. Based on at least one of the properties, a first state of the video is configured, and the video is presented according to the first state. During playback of the video, a change in one of the device properties is detected, and the video is seamlessly transitioned to a second state based on the change.

The first state of the video is configured by, for example, setting which video and/or audio content will be played, setting the dimensional ratio and/or quality of the video, and/or setting the viewing region of the video to a particular partial area of the video. Similarly, seamlessly transitioning the video to the second state can involve changing audio/video content playback, video dimensional ratio, video quality, and/or the position, shape and/or size of the video viewing region. The seamless transition to the second state can also include seamlessly transitioning from a first to a second video in a plurality of videos that are simultaneously received.

In one implementation, a plurality of videos associated with a particular one of the properties is provided, and each video is associated with a different value of the particular property. When determining that a change in a device property has occurred, the video can be seamlessly transitioned to a second video that is associated with the value of the changed property.

Aspects of these inventions also include corresponding systems and computer programs. Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of systems and methods for adaptive and responsive media, in which a media presentation (e.g., video) playing on a user device responds in real-time to a change in one or more properties of the user device by altering the content, viewport, or other characteristic relating to the presentation.

Figure 1:
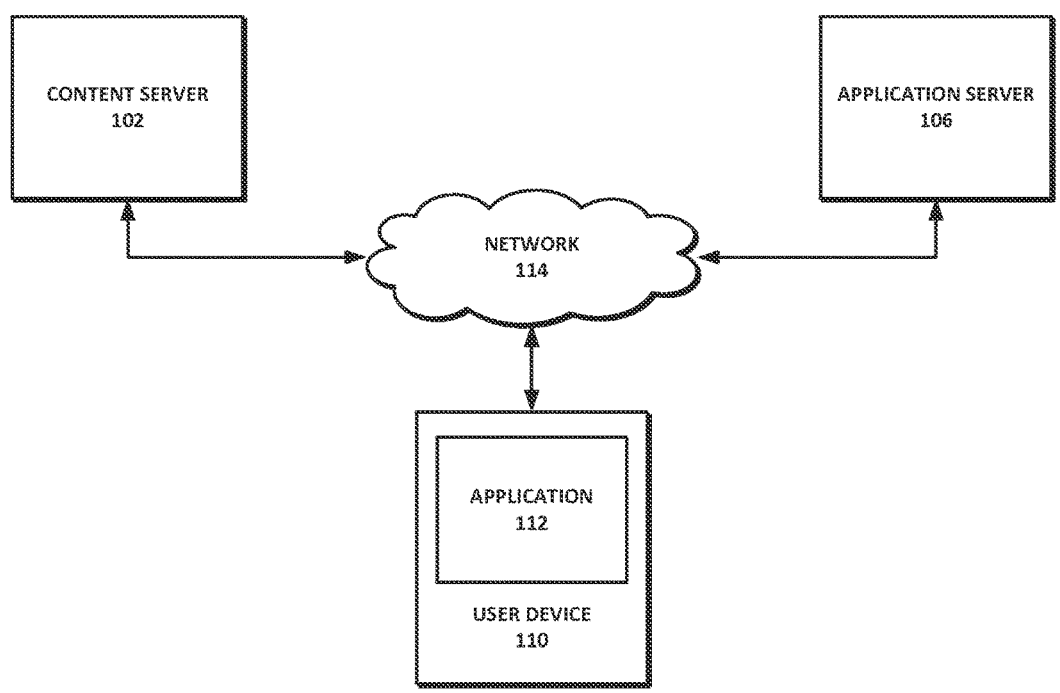
FIG. 1 depicts a high-level diagram of a system architecture according to an implementation.

Referring to FIG. 1, media content can be presented to a user on a user device 110 having an application 112 capable of playing and/or editing the content. The user device 110 can be, for example, a smartphone, tablet, laptop, palmtop, wireless telephone, television, gaming device, music player, mobile telephone, information appliance, workstation, a smart or dumb terminal, network computer, personal digital assistant, wireless device, minicomputer, mainframe computer, or other computing device, that is operated as a general purpose computer or a special purpose hardware device that can execute the functionality described herein.

The application 112 can be a video player and/or editor that is implemented as a native application, web application, or other form of software. In some implementations, the application 112 is in the form of a web page, widget, and/or Java, JavaScript, .Net, Silverlight, Flash, and/or other applet or plug-in that is downloaded to the device and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology can also be employed.

Media content can be provided to the user device 110 by content server 102, which can be a web server, media server, a node in a content delivery network, or other content source. Application server 106 can provide the application 112 (or a portion thereof) to the user device 110. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

As a general matter, the techniques described herein can be implemented in any appropriate hardware or software. If implemented as software, the processes can execute on a system capable of running one or more commercial operating systems such as the Microsoft Windows® operating systems, the Apple OS X® operating systems, the Apple iOS® platform, the Google Android™ platform, the Linux™ operating system and other variants of UNIX® operating systems, and the like. The software can be implemented on a general purpose computing device in the form of a computer including a processing unit, a system memory, and a system bus that couples various system components including the system memory to the processing unit.

If implemented as software, such software can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 2:
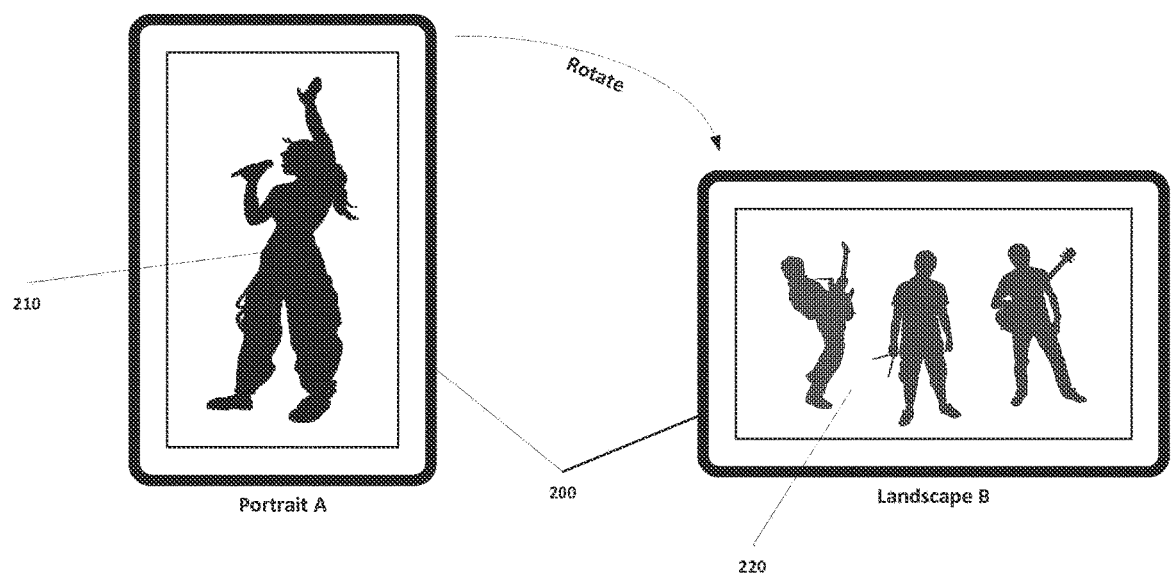
FIG. 2 depicts a video state change responsive to a rotation of a user device.

FIG. 2 depicts a user device in the form of a smartphone 200 having a number of associated properties. One example property of the smartphone 200 is its physical orientation, which can refer to the alignment of the smartphone screen in a portrait or landscape mode. The orientation can also include a rotational position of the smartphone 200 in three-dimensional space determined based on readings from a sensor (e.g., gyroscope) in the device. Other properties of user devices, such as smartphone 200, can include screen resolution, aspect ratio, display proportions, and physical screen size. Device properties can also include the type of device (e.g., smartphone, smart watch, desktop, laptop, gaming device, television, etc.), model, brand, and other physical characteristics of the device. In some implementations, the existence of a particular device property depends on the device type and/or software operating on the device (e.g., operating system). For example, for device operating systems that support windowed applications (e.g., desktops, laptops, televisions, or other devices supporting Microsoft Windows® operating systems or Apple OS X® operating systems), one device property can be the window size (e.g., height and width values) of a media player application (e.g., native application, browser, or otherwise), or the window state (e.g., minimized, maximized, in thumbnail) of a media player application.

As shown in FIG. 2, smartphone 200 is rotatable between a portrait mode A and a landscape mode B. In a typical mode of operation, when a mobile device, such as a smartphone or tablet, is displaying a video, photograph, webpage, or the like, rotating the device between portrait and landscape results in a rotation of the item displayed on the device screen in order to maintain the orientation of the item while, in some cases, simultaneously resizing the item to fit to the current screen proportions. For example, an image that occupies the entire device screen in landscape mode will retain its orientation when the device is rotated to portrait mode, but is resized so that the width of the image fits within the narrower width of the portrait screen, resulting in mattes displayed above and below the image.

Advantageously, the present technique provides further enhancements to the user's media viewing experience beyond simple rotation or resizing of images or videos. For instance, in one implementation, the rotation of the smartphone 200 from portrait mode A to landscape mode B results in a change in the state of the video presentation (in this example, a change in the video and/or audio content). Still referring to FIG. 2, a smartphone user watching a music video can seamlessly alternate between two distinct views of the video by switching between portrait and landscape modes. As depicted, when the smartphone 200 is positioned in portrait mode A, video of the lead singer 210 is shown to the user. Upon rotating the smartphone 200 to landscape mode B, the video changes to show the rest of the band 220. In some implementations, the audio plays continuously and seamlessly when changing between modes, such that no user-perceptible gaps, pauses, or buffering occurs. The same audio can be played independent of the display mode of the smartphone 200 or, in some instances, the audio can be altered, enhanced, or otherwise differ among modes (e.g., when in portrait mode A, the volume of the lead singer's vocals can be emphasized relative to the musical instruments of the band 220 and, when in portrait mode B, the sound of the instruments can be emphasized).

It should be appreciated that the present technique is not limited to two display modes (i.e., landscape and portrait). Rather, various combinations of audio, video, and/or other media content can be shown based on any rotation or positioning of a user device. For example, a first video may be shown when in portrait mode, a second video when changing to landscape mode by rotating the device counter-clockwise, a third video when changing to landscape mode by rotating the device clockwise, a fourth video when tilting the device away from the user, a fifth video when tilting the device toward the user, a sixth video when laying the device flat, and so on.

Figure 3:
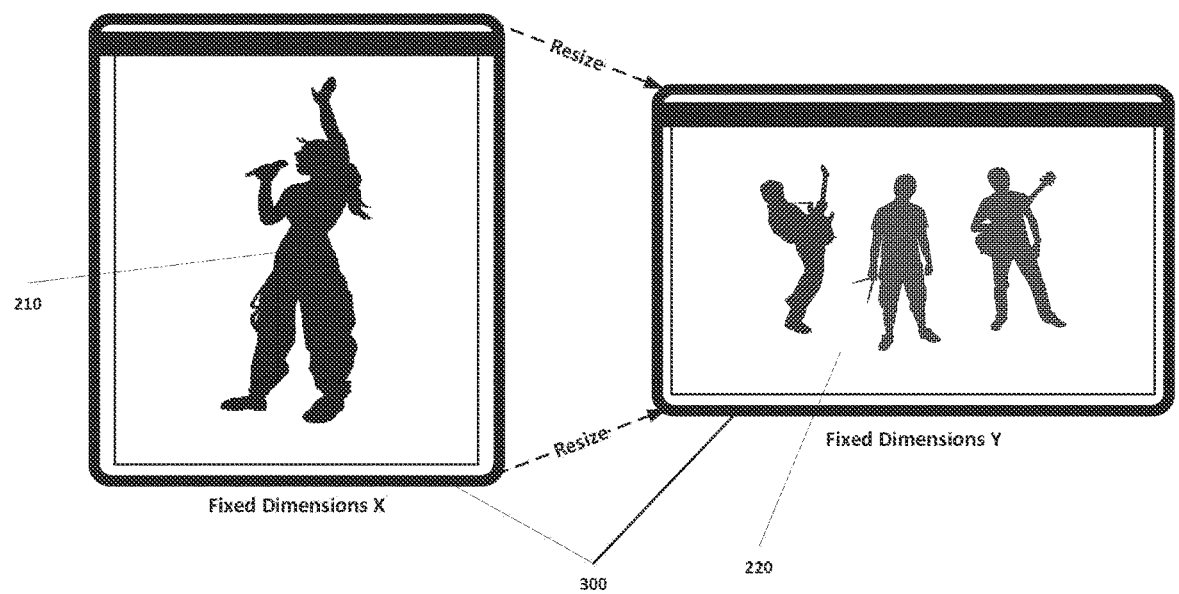
FIG. 3 depicts a video state change responsive to a window resizing.

FIG. 3 depicts a concept similar to that shown in FIG. 2, with a windowed media player 300 on a desktop computer, laptop, or other user device supporting windowed applications. In this instance, rather than physically rotating or repositioning the user device, the user changes the window size or state (e.g., minimized, maximized, thumbnailed) of the media player 300 using an input device (e.g., mouse, keyboard, touchscreen, etc.). In some instances, the media player 300 is resizable to fixed dimensions and will "snap to" the closest size as a user resizes the associated window. Different media content can be associated with each fixed window dimension (defined height and width). For example, using the same music video example as described with respect to FIG. 2, upon changing from fixed dimensions X to fixed dimensions Y, the video shown in the media player 300 can change from the singer 210 to the band 220. There can be multiple fixed dimensions with varying audio and/or video content associated with particular fixed dimensions.

In some implementations, instead of limiting the windowed media player 250 to fixed dimensions, ranges for window heights and/or widths can be defined and associated with differing media content. For example, assuming the height and width of a particular window can be individually resized to occupy between 5% and 100% of a screen, Table 1 indicates which of three different videos is presented depending on current window dimensions.

TABLE 1

| Window Height Range | Window Width Range | Video |
|---|---|---|
| 5% to <50% | 5% to 100% | Video 1 |
| 50% to 100% | 5% to <25% | Video 2 |
| 50% to 100% | 25% to 100% | Video 3 |

In addition to changes in audio and video content, as described above, other states of playing media can be dynamically modified in real-time based on a change to a device property (or a combination of device properties). Such states can include, but are not limited to, video aspect ratio, video dimensions, video and/or audio quality, viewport (i.e., the portion of the video visible to the user), video and/or audio playback speed, audio volume, and audio/video sound mix.

In one example, a change in a property associated with a user device can result in a change in the size and/or position of the viewport. Referring to FIGS. 4A-4D, a video 400 of a family is provided to a user device 402; however, only a portion of the video 400 is viewable by the user at any point in time during playback of the video 400. The viewable portion is defined by the viewport 410, which can be resized, rotated, or moved around about the video 400 during playback in response to change in a device property. In one implementation, the viewport is a mask layered over the video that includes a resizable transparent area allowing the user to see a portion of the underlying video. To reposition the viewport 410, the mask can be moved with respect to the video 400 and/or the video 400 can be moved with respect to the mask.

Figure 4A:
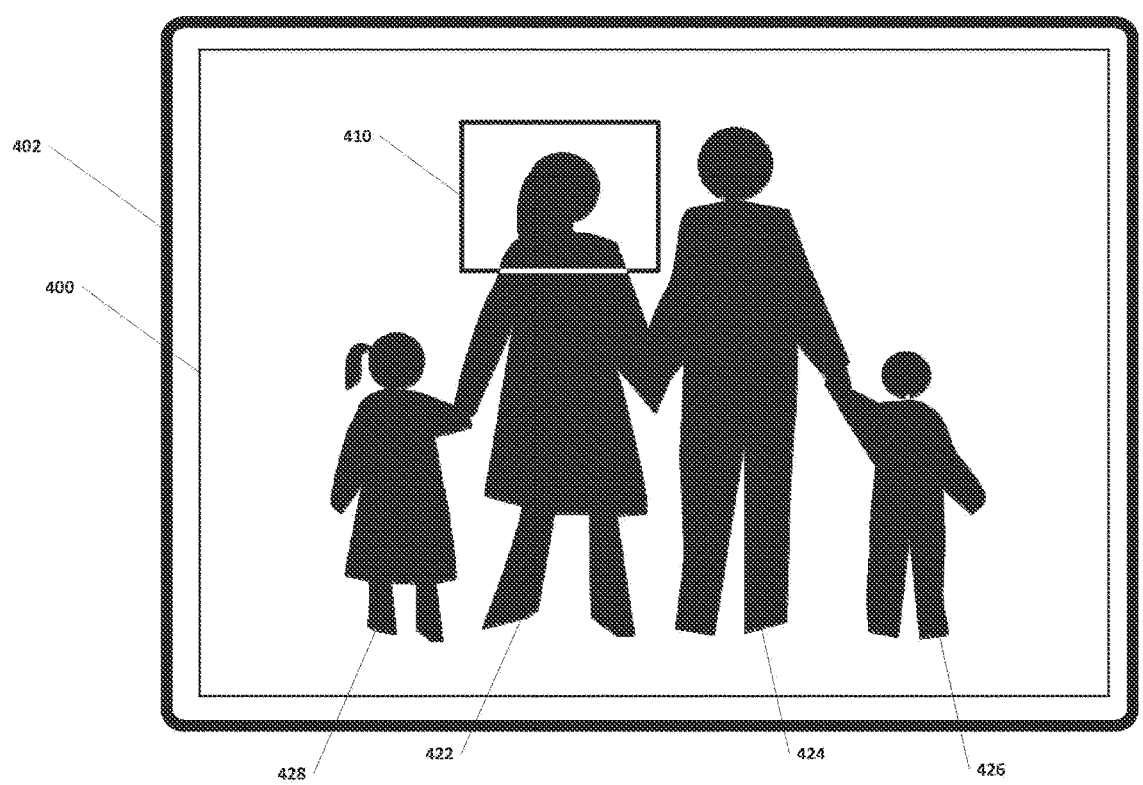
FIGS. 4A-4D depict a viewport location modification responsive to a change in a user device property.
Figure 4B:
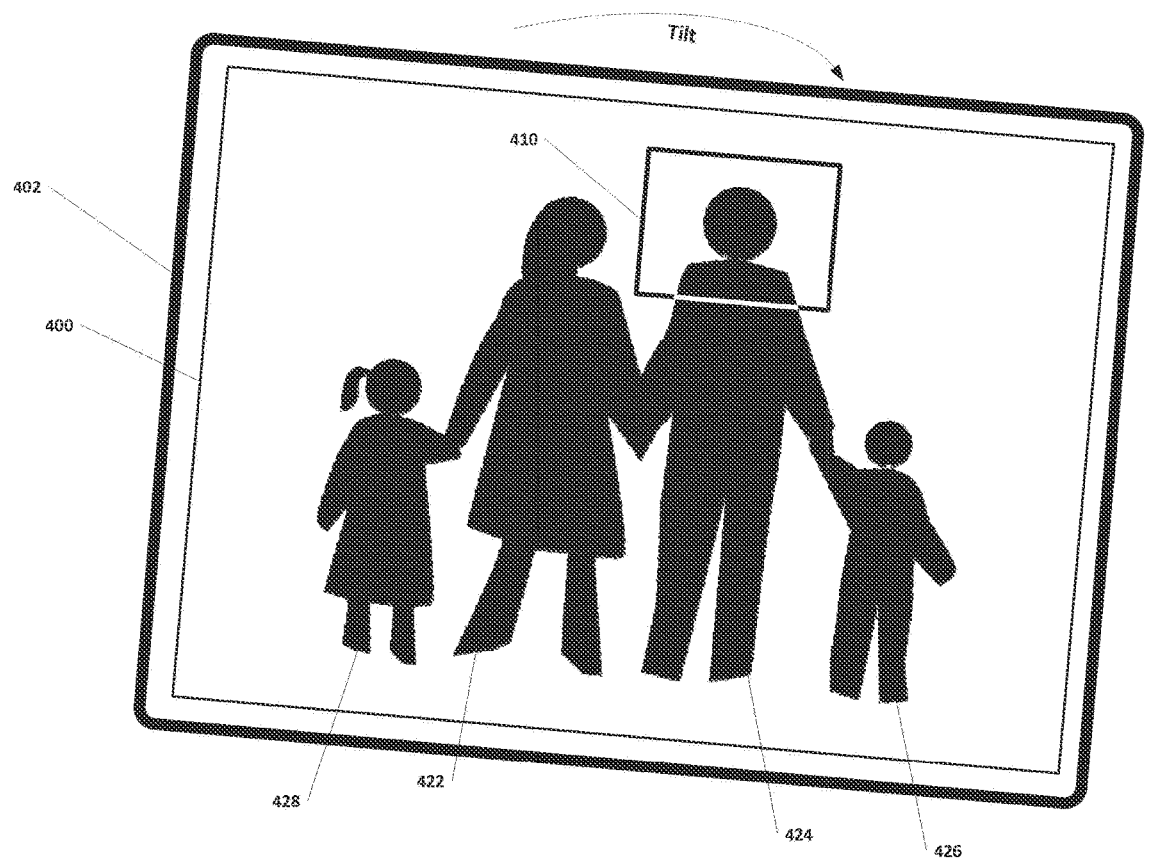
Figure 4C:
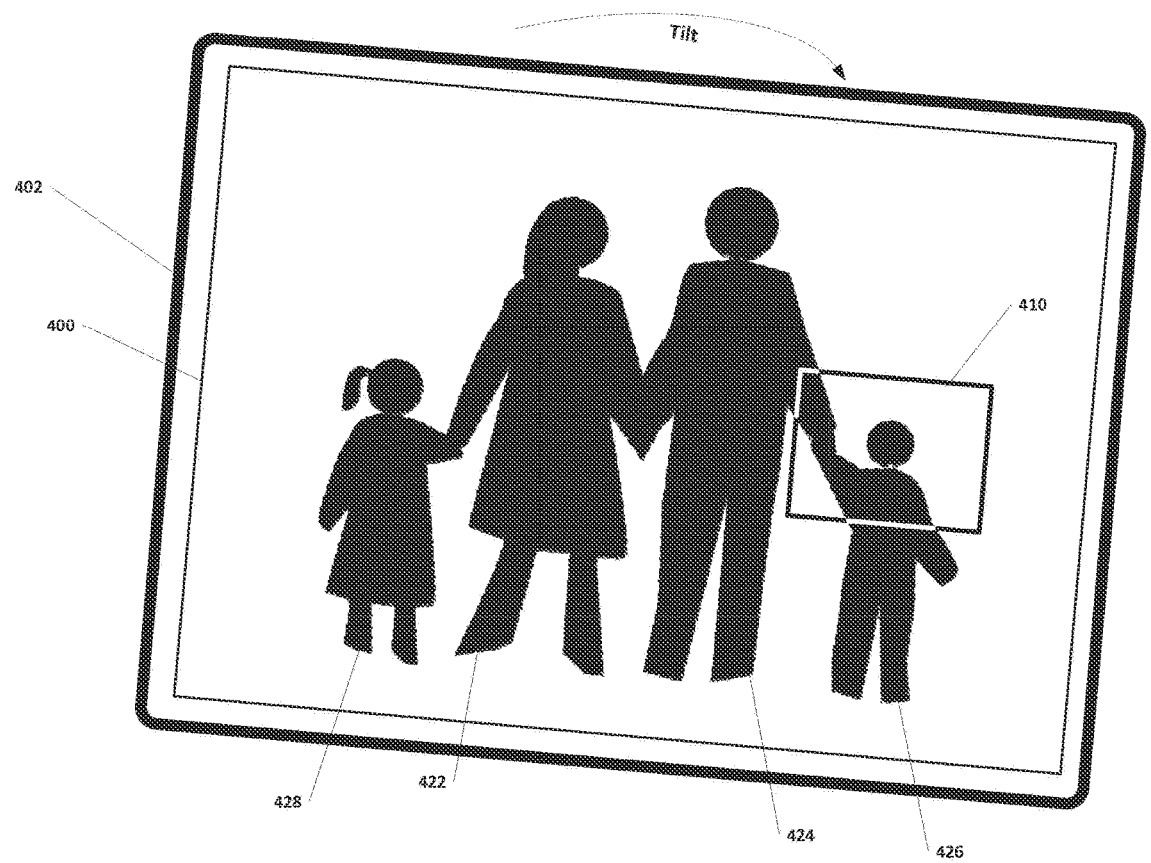
Figure 4D:
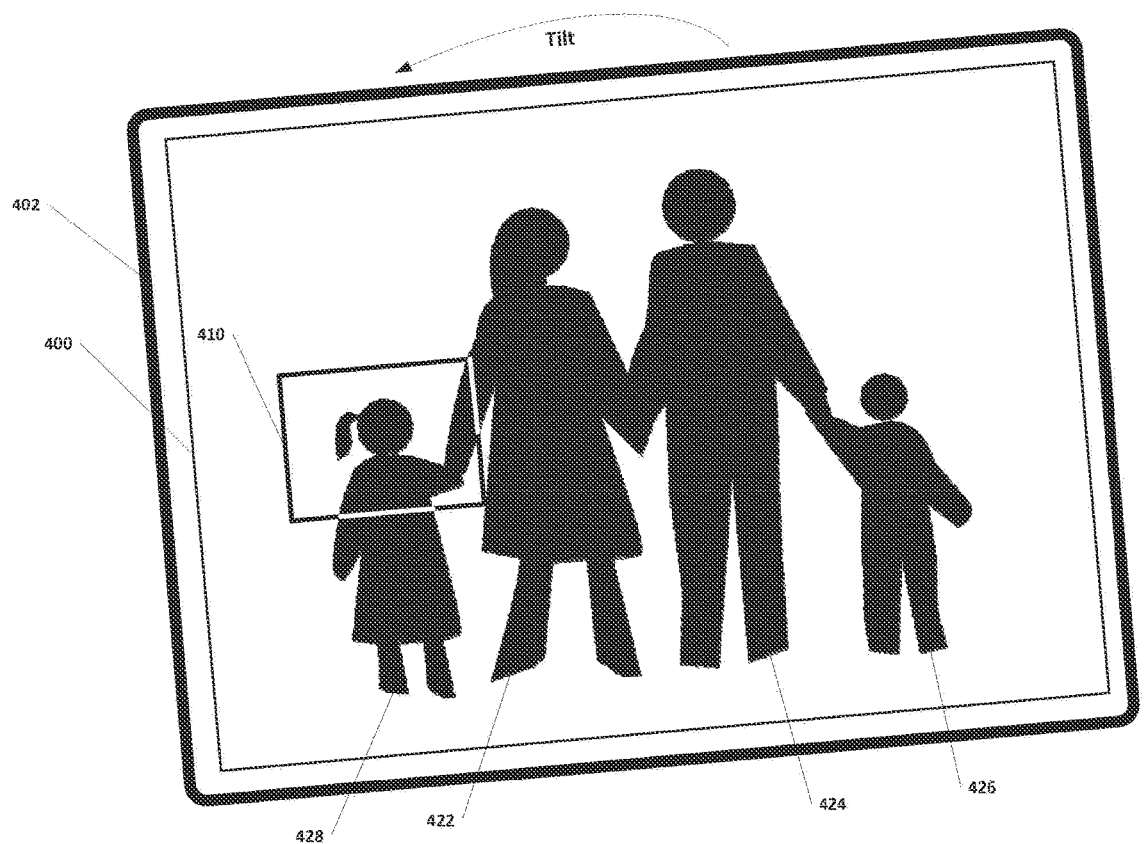

As depicted, initially, the viewport 410 allows the user to see video playback of the mother 422 (FIG. 4A). Upon the user tilting the device 402 in a clockwise direction (e.g., in the case of a smartphone, briefly rotating the smartphone clockwise and returning it to the 12 o'clock position), the viewport 410 can change to show video of the father 424 (FIG. 4B). The viewport 410 can move from the mother 422 to the father 424 while the device 402 is being tilted, or can directly switch to the father 424 upon completing the tilting motion. Similarly, the user can tilt the device 402 again in the clockwise direction to change the viewport 410 to video of the young boy 426 (FIG. 4C), or can tilt the device 402 repeatedly in the counter-clockwise direction to change the viewport 410 to video of the young girl 428 (FIG. 4D). In some implementations, a single rotational motion can move the viewport 410 among family members that are one or more persons apart, depending on the amount of rotation (e.g., a 90-degree rotation clockwise moves the viewport from the mother 422 to the boy 426, a 180-degree rotation counter-clockwise moves the viewport from the boy 426 to the girl 428, and so on).

Figure 5A:
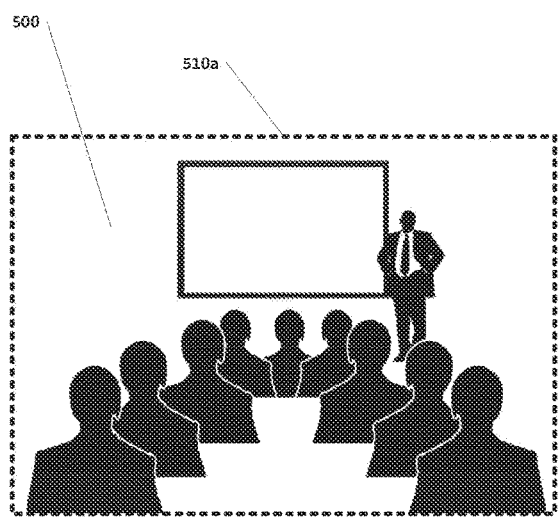
FIGS. 5A and 5B depict viewport size and location modifications responsive to a change in a user device property.
Figure 5B:
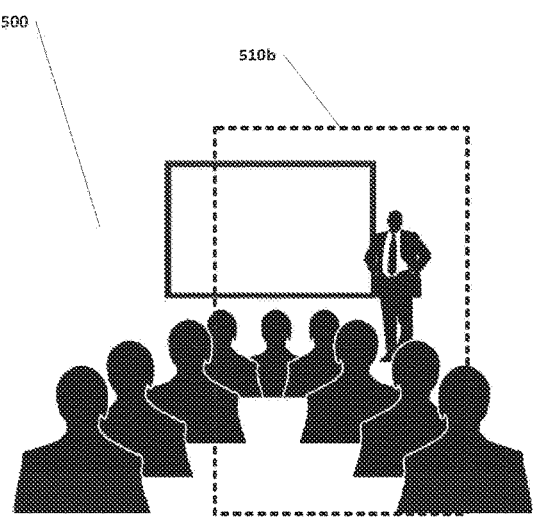

FIGS. 5A and 5B depict a change in device property which results in the viewport 510a to a lecture video 500 changing both size and location. In the first instance, in FIG. 5A, the viewport 510a allows the user to view the full height (300 units) and width (450 units) of the video 500, thereby displaying the full dimensions of the lecture video 500, including the speaker, presentation screen, and audience. The viewport 510a is a rectangular shape (although other shapes are contemplated), and the upper left-hand corner of the viewport 510a is positioned at coordinates (0, 0). Referring now to FIG. 5B, upon detecting a change in a property of the device (e.g., the device is rotated from landscape to portrait mode), the viewport 510b is modified in size and repositioned to better accommodate the modified state of the device. Specifically, the viewport 510b is modified to a size that better fills the screen of the user device (height=300 units, width=200 units) and is positioned with the upper left-hand corner at coordinates (200, 0), to better focus on the speaker. The video and viewport may be zoomed out or in so that the viewport fills the height and/or width of the device display.

It should be noted that changes in various combinations of media states can occur based on a change in one or more device properties. For example, rotating a device so that it changes from portrait to landscape mode can result in a combined change in video content, audio volume, and viewport size for a particular media presentation. As another example, the audio content of a media presentation can change upon the occurrence of multiple property changes simultaneously or within a particular time period, such as two tilt movements in the same direction within three seconds.

In addition to the music and lecture videos described above, the techniques described herein have wide applicability and are useful in a variety of situations. In one example, a movie watched in landscape mode on a user device includes a director's commentary audio track in which, from time to time, the director provides commentary on scenes in the movie currently being watched. During playback of the video and audio, upon changing the orientation of the device to portrait mode, accompanying video of the director providing the commentary is shown instead of the movie. For example, the director can be shown sitting in front of a monitor and pointing out various details in the film as he comments. Of note, the transition between landscape and portrait mode, and vice-versa, is seamless, such that the audio commentary is continuously synchronized and continues playback without buffering or delay from the same point in time where the switch is made. In another example, a full-screen video includes video thumbnails (e.g., picture-in-picture) of parallel video tracks. A user interacting with the full-screen video can select one of the thumbnails to switch seamlessly to the parallel track.

Figure 6:
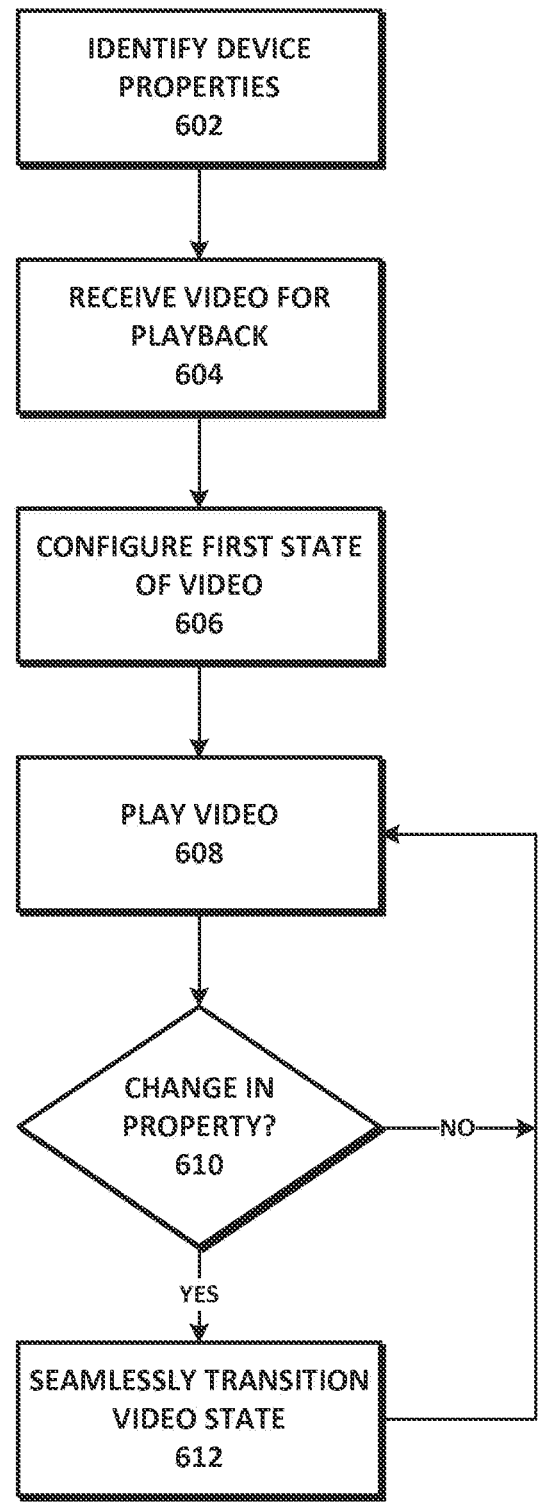
FIG. 6 depicts a flowchart of a method for providing adaptive and responsive media according to an implementation.

In accordance with the systems and techniques described herein, FIG. 6 depicts one implementation of a method for providing adaptive and responsive video. In STEP 602, an application on a user device, such as a media player on a smartphone or tablet, identifies one or more properties associated with the device. The identified properties can be limited to a subset of device properties that the application considers in determining whether to change the state of the video (e.g., orientation, window size, and/or other device properties). A video for playback is received at the device (STEP 604), and the first state of the video is configured based on one or more of the identified properties (STEP 606). For example, if the device is currently in landscape mode, a video suitable for landscape mode can be set for initial playback. In STEP 608, the video is played according to the configured first state.

During presentation of the video, the application determines whether there has been a change in one or more of the identified properties associated with the device (STEP 610). For example, the application may determine that the device has been rotated from a landscape orientation to a portrait orientation. If a change in a relevant property is detected, and there is a different video state associated with the change, the application seamlessly transitions the video to a second state based on the change. Referring to the previous example, if there is different video content associated with the portrait orientation, the different video content can be seamlessly and instantly switched to upon the change in the device orientation property from landscape to portrait. The video can continue to play uninterrupted (return to STEP 608), and subsequent property changes can be detected and state transitions made.

Various techniques can be used for real-time modification of the state of a media presentation (e.g., switching currently playing media content) in response to a change in a user device property or properties. For example, in addition to the masking/viewport technique applied to a single video, as described above, a media presentation can be dynamically modified using "parallel tracks," as disclosed in U.S. patent application Ser. No. 14/534,626, filed on Nov. 6, 2014, and entitled "Systems and Methods for Parallel Track Transitions," the entirety of which is incorporated by reference herein.

For example, referring to facilitate near-instantaneous switching among parallel "tracks" or "channels", multiple media tracks (e.g., video streams) can be downloaded simultaneously to a user's device, in separate data streams and/or combined together in container structures with associated metadata. Upon selecting a streaming video for playback, an upcoming portion of the video stream is typically buffered by a video player prior to commencing playback of the video, and the video player can continue buffering as the video is playing. Accordingly, in one implementation, if an upcoming segment of a video presentation (including the beginning of the presentation) includes two or more parallel tracks, an application on the user device (e.g., a video player) can initiate download of the upcoming parallel tracks (in this example, three tracks) substantially simultaneously (STEP 702). The application can then simultaneously receive and/or retrieve video data portions of each track (STEP 712). The receipt and/or retrieval of upcoming video portions of each track can be performed prior to playback of any particular parallel track as well as during playback of a parallel track. The downloading of video data in parallel tracks can be achieved in accordance with smart downloading techniques such as those described in U.S. Pat. No. 8,600,220, issued on Dec. 3, 2013, and entitled "Systems and Methods for Loading More than One Video Content at a Time," the entirety of which is incorporated by reference herein.

Upon reaching a segment of the video presentation that includes parallel tracks, the application makes a determination in real-time of which track to play (STEP 720). The determination can be based on the state of one or more device properties. For example, in one implementation, each parallel track is mapped to one or more device properties, such as screen size, window size, or device orientation and/or a value of a particular device property, such as screen size=3 in.×4.5 in., window size=1024 pixels×768 pixels, or orientation="landscape". This mapping information can be included in the metadata associated with each track that is transmitted to the user device. Upon initially playing the parallel video, the initial or current state of one or more device properties is determined, and the track associated with that property or properties is played. For example, if the device is oriented in portrait mode when the video commences, a parallel track associated with the device property value="portrait" can be selected as the track to play.

In STEP 724, based on the determined track to play, the application appends a portion of the video data from the determined track to the current video being presented. The appended portion can be in temporal correspondence with an overall timeline of the video presentation. For example, if two parallel tracks are 30 seconds long and begin at the same time, a switch from the first track (e.g., at 10 seconds in) to the second track results in playback continuing with the second track video at the same point in time (i.e., at 10 seconds in). One will appreciate, however, that tracks can overlap in various manners and may not correspond in length. Following the appending, playback of the video continues using the appended video data from the determined track (STEP 728). As the video is playing, the relevant properties of the device can be monitored to detect any changes that may affect which parallel track should be selected for playback (return to STEP 720). If, for example, the device is rotated into landscape mode, the property change is identified and the video for a parallel track associated with the landscape mode can be switched to immediately or after a delay. Switching among tracks can be seamless, such that no noticeable delays, buffering, or gaps in audio and/or video playback occur.

Figure 7:
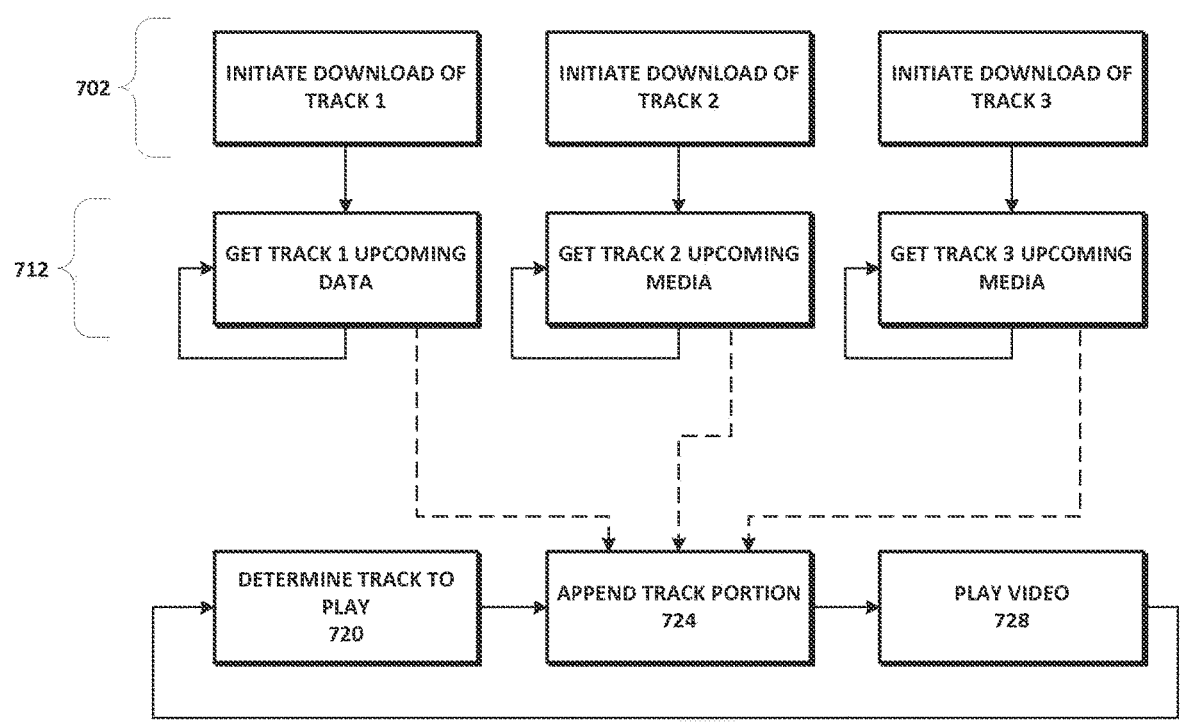
FIG. 7 depicts a flowchart of a method for providing parallel tracks in a media presentation according to an implementation.
Figure 8:
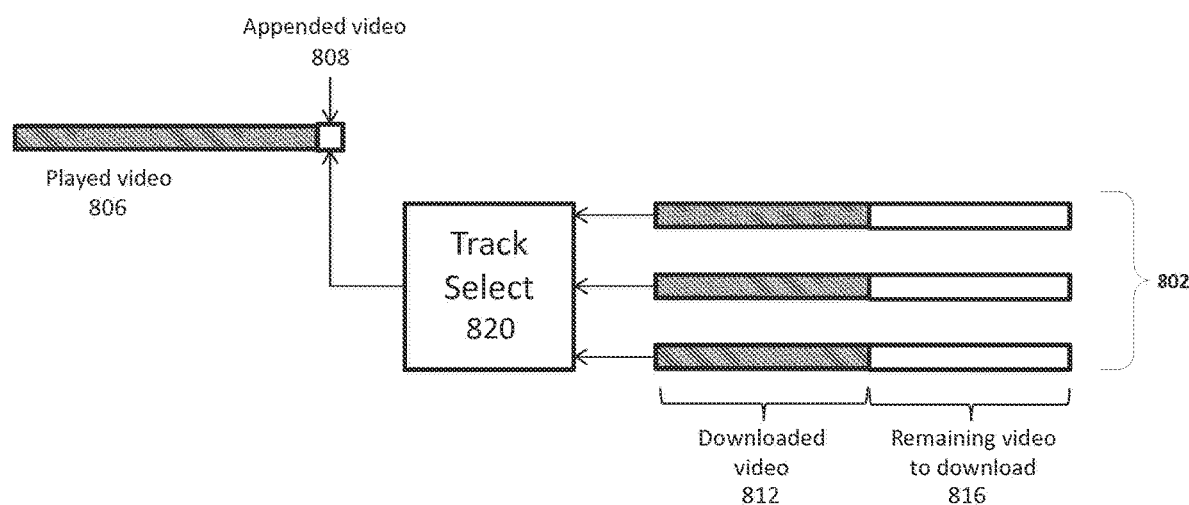
FIG. 8 depicts an appending of a video portion from one of a number of parallel tracks.

FIG. 8 provides an abstracted visual representation of the process in FIG. 7. Specifically, three parallel tracks 802 of the same length are simultaneously downloaded, and, in this example, each of the tracks 802 has been downloaded approximately in the same amount (represented by downloaded video 812), with approximately the same amount of each track to be downloaded (represented by remaining video to download 816). The video player or other application includes a function 820 that determines which track should be selected and played, and a portion 808 of the selected track is appended to the currently playing video, after the played video 804 up to that point.

In one implementation, the appended portion 808 is relatively short in length (e.g., 100 milliseconds, 500 milliseconds, 1 second, 1.5 seconds, etc.). Advantageously, the short length of the appended portion 808 provides for near-instantaneous switching to a different parallel track. For example, while the video is playing, small portions of the selected parallel track are continuously appended onto the video. In one instance, this appending occurs one portion at a time and is performed at the start of or during playback of the most recently appended portion 808. If a determination is made that a different parallel track has been selected, the next appended portion(s) will come from the different track. Thus, if the appended video portion 808 is 500 milliseconds long and a selection of a different track is made at the start of or during playback of the portion 808, then the next portion from the different track will be appended on the video and presented to the user no more than 500 milliseconds after the selection of the different track. As such, for appended portions of short length, the switch from one parallel track to another can be achieved with an imperceptible delay.

In one implementation, dynamically adapting media content to changes in device properties can be incorporated into branched media presentations, such as interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments branch off from a segment, the next video segment to watch can be selected based on the state of a device property. For example, the user can interactively select the branch or path to traverse by physically manipulating the orientation of the user device (e.g., tilting or rotating a smartphone or tablet). As another example, the branch to traverse can be automatically determined based on, e.g., the current device orientation, screen size, window size, or other device property.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. This can be accomplished, for example, by the user interacting with a user interface or changing a property of the user device. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a device property-based, default, previously identified selection, or random selection can be automatically made by the system. In some instances, the user is not provided with options; rather, the system automatically selects the segments that will be shown based on information that is associated with the device, the user, other users, or other factors, such as the current date. For example, the present system can automatically select subsequent segments based on the device type, orientation, screen resolution, aspect ratio, display proportions, physical screen size, window size, window state, and other device properties. As another example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple play-throughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing or by automatic path selection, as described above. In some implementations, user-selectable options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

Although the systems and methods described herein relate primarily to audio and video playback, the invention is equally applicable to various streaming and non-streaming media, including animation, video games, interactive media, and other forms of content usable in conjunction with the present systems and methods. There can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

What is claimed is:

1. A computer-implemented method comprising:
    providing a video presentation on a user device, wherein the video presentation is a branching video presentation comprising a plurality of video segments, each video segment comprising a predefined portion of one or more paths in the branching video presentation;
    identifying one or more user device properties associated with the user device; and during presentation of the video presentation on the user device:
  receiving, at the user device over a network, a video segment container structure for a first video segment of the plurality of video segments, the video segment container structure including a first video file and a second, different video file combined together with associated metadata, wherein the metadata includes mapping information assigning a first value of the one or more user device properties to the first video file and a second value of the one or more user device properties to the second video file;
  detecting a current state of the user device;
  presenting the first video file on the user device in response to a determination that the current state of the user device corresponds to the first value of the one or more user device properties, wherein a received portion of the first video file is presented prior to receiving a remaining portion of the first video file at the user device;
  determining that a change in the current state of the user device has occurred; and
  in response to a determination that the current state of the user device corresponds to the second value of the one or more user device properties, transitioning from presentation of the first video file to presentation of the second video file on the user device, wherein the transitioning includes appending a received portion of the second video file to a presented portion of the first video file prior to receiving a remaining portion of the second video file at the user device.

2. The method of claim 1, wherein the one or more user device properties are selected from a group consisting of physical orientation, model, physical screen size, screen resolution, and window size.

3. The method of claim 1, wherein presenting the first video file in response to a determination that the current state of the user device corresponds to the first value of the one or more user device properties comprises setting a dimensional ratio of the first video file and/or setting a quality of presentation of the first video file.

4. The method of claim 1, wherein presenting the first video file in response to a determination that the current state of the user device corresponds to the first value of the one or more user device properties comprises setting a viewing region of the first video file to a partial dimensional area of the first video file.

5. The method of claim 1, wherein presenting the first video file in response to a determination that the current state of the user device corresponds to the first value of the one or more user device properties comprises setting a viewing region of the first video file to a full dimensional area of the first video file.

6. The method of claim 1, further comprising:
  playing a first audio file during presentation of the first video file on the user device; and
  in response to a determination that the current state of the user device corresponds to the second value of the one or more user device properties, transitioning from playing the first audio file to playing a second, different audio file on the user device.

7. The method of claim 1, wherein the first video file and the second video file comprise portions of a video presentation having an associated timeline, and wherein transitioning from presentation of the first video file to presentation of the second video file comprises:
  identifying a first point in time in a playback length of the first video file at which the transitioning occurs, wherein the first point in time corresponds to a particular point in time on the timeline; and
  starting presentation of the second video file at a second point in time, wherein the second point in time comprises a time offset from a beginning of the second video file corresponding with the particular point in time on the timeline.

8. The method of claim 1, further comprising:
  determining that a media player window in which the first video file is being presented has been resized; and
  transitioning to presentation of the second video file based on a mapping of dimensions of the resized media player window to the second video file.

9. The method of claim 1, further comprising, in transitioning to presentation of the second video file, modifying a position, a shape, and/or a size of a viewing region of the second video file.

10. A system comprising:
  at least one memory storing computer-executable instructions; and
  at least one processor for executing the instructions stored on the memory, wherein execution of the instructions programs the at least one processor to perform operations comprising:
    providing a video presentation on a user device, wherein the video presentation is a branching video presentation comprising a plurality of video segments, each video segment comprising a predefined portion of one or more paths in the branching video presentation;
    identifying one or more user device properties associated with the user device; and
    during presentation of the video presentation on the user device:
      receiving, at the user device over a network, a video segment container structure for a first video segment of the plurality of video segments, the video segment container structure including a first video file and a second, different video file combined together with associated metadata, wherein the metadata includes mapping information assigning a first value of the one or more user device properties to the first video file and a second value of the one or more user device properties to the second video file;
      detecting a current state of the user device;
      presenting the first video file on the user device in response to a determination that the current state of the user device corresponds to the first value of the one or more user device properties, wherein a received portion of the first video file is presented prior to receiving a remaining portion of the first video file at the user device;
      determining that a change in the current state of the user device has occurred; and
      in response to a determination that the current state of the user device corresponds to the second value of the one or more user device properties, transitioning from presentation of the first video file to presentation of the second video file on the user device, wherein the transitioning includes appending a received portion of the second video file to a presented portion of the first video file prior to receiving a remaining portion of the second video file at the user device.

11. The system of claim 10, wherein the one or more user device properties are selected from a group consisting of physical orientation, model, physical screen size, screen resolution, and window size.

12. The system of claim 10, wherein presenting the first video file in response to a determination that the current state of the user device corresponds to the first value of the one or more user device properties comprises setting a dimensional ratio of the first video file and/or setting a quality of presentation of the first video file.

13. The system of claim 10, wherein presenting the first video file in response to a determination that the current state of the user device corresponds to the first value of the one or more user device properties comprises setting a viewing region of the first video file to a partial dimensional area of the first video file.

14. The system of claim 10, wherein presenting the first video file in response to a determination that the current state of the user device corresponds to the first value of the one or more user device properties comprises setting a viewing region of the first video file to a full dimensional area of the first video file.

15. The system of claim 10, wherein the operations further comprise:
 playing a first audio file during presentation of the first video file on the user device; and
 in response to a determination that the current state of the user device corresponds to the second value of the one or more user device properties, transitioning from playing the first audio file to playing a second, different audio file on the user device.

16. The system of claim 10, wherein the first video file and the second video file comprise portions of a video presentation having an associated timeline, and wherein transitioning from presentation of the first video file to presentation of the second video file comprises:
 identifying a first point in time in a playback length of the first video file at which the transitioning occurs, wherein the first point in time corresponds to a particular point in time on the timeline; and
 starting presentation of the second video file at a second point in time, wherein the second point in time comprises a time offset from a beginning of the second video file corresponding with the particular point in time on the timeline.

17. The system of claim 10, wherein the operations further comprise:
 determining that a media player window in which the first video file is being presented has been resized; and
 transitioning to presentation of the second video file based on a mapping of dimensions of the resized media player window to the second video file.

18. The system of claim 10, wherein the operations further comprise, in transitioning to presentation of the second video file, modifying a position, a shape, and/or a size of a viewing region of the second video file.

* * * * *